United States Patent
Wu et al.

(10) Patent No.: US 7,843,184 B2
(45) Date of Patent: Nov. 30, 2010

(54) POWER SUPPLY WITH SEPARATE LINE REGULATION AND LOAD REGULATION

(75) Inventors: Xin Wu, Shanghai (CN); Sen Dou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/967,835

(22) Filed: Dec. 31, 2007

(65) Prior Publication Data
US 2009/0167278 A1 Jul. 2, 2009

(51) Int. Cl.
*G05F 1/40* (2006.01)
(52) U.S. Cl. ..................................................... 323/282
(58) Field of Classification Search ................ 323/268, 323/271, 282, 285, 299, 349–351; 363/17, 363/65, 71, 97, 98, 131, 132
See application file for complete search history.

(56) References Cited

U.S. PATENT DOCUMENTS

| | | | | |
|---|---|---|---|---|
| 5,877,945 | A * | 3/1999 | Liu | 363/17 |
| 7,227,763 | B1 * | 6/2007 | Noh et al. | 363/56.02 |
| 7,456,621 | B2 * | 11/2008 | Leung et al. | 323/283 |
| 7,501,800 | B2 * | 3/2009 | Kim et al. | 323/207 |

* cited by examiner

*Primary Examiner*—Matthew V Nguyen
(74) *Attorney, Agent, or Firm*—Blakely, Sokoloff, Taylor & Zafman LLP

(57) ABSTRACT

A system to supply power to an electronic system, comprises a set of one or more power units each configured to transform an input voltage into an output voltage; and a line regulator coupled to a power unit and configured to modulate a duty cycle of the power unit and a load regulator configured to provide a second control signal to a power unit to selectively enable the power unit based on load information provided by the electronic system.

12 Claims, 4 Drawing Sheets

POWER SUPPLY WITH SEPARATE LINE REGULATION AND LOAD REGULATION

BACKGROUND

Some power supplies may be provided with one or more discrete components to stabilize an output voltage of the power supplies. For example, in some power supplies that comprise switching devices to convert a DC input into an AC input, a duty cycle of the switching devices may be modulated to regulate the output voltage. Some factors may impact modulation of the duty cycle, including, e.g., an input voltage and/or an output current as well as other factors, e.g., by close loop voltage feedback control. Some power supplies may not always operate at a point corresponding to a range of load range. For example, the conversion efficiency may peak at an increased load and may drop off at a reduced load.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
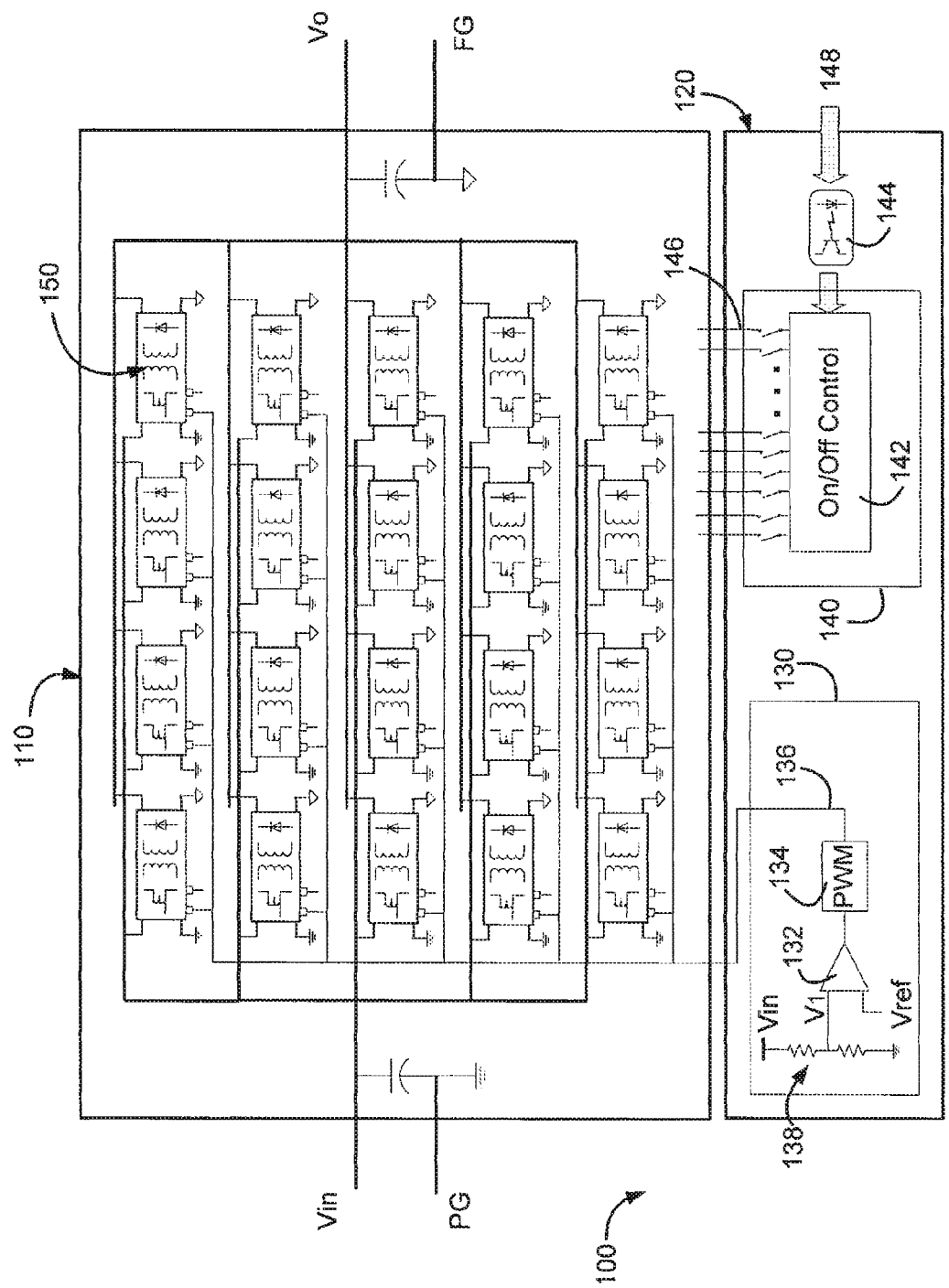
FIG. 1 is a schematic diagram of an embodiment of a system that may supply power.

In the following detailed description, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numbers refer to the same or similar functionality throughout the several views.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 illustrates an exemplary embodiment of a system 100 that may supply power for an electronic system, for example, a computing device, a server. Referring to FIG. 1, in one embodiment, the system 100 may comprise a power circuit 110. The power circuit 110 may be configured to convert an input voltage Vin into an output voltage Vo. In another embodiment, the power circuit 110 may comprise a plurality of units 150. In one embodiment, the plurality of power unit 150 may be connected parallel in the power circuit 110. In another embodiment, each power unit 150 may have the same power rating. A number of the units 150 may be determined based upon the power rating of a unit and/or a power rating of the power circuit 110.

Figure 2:
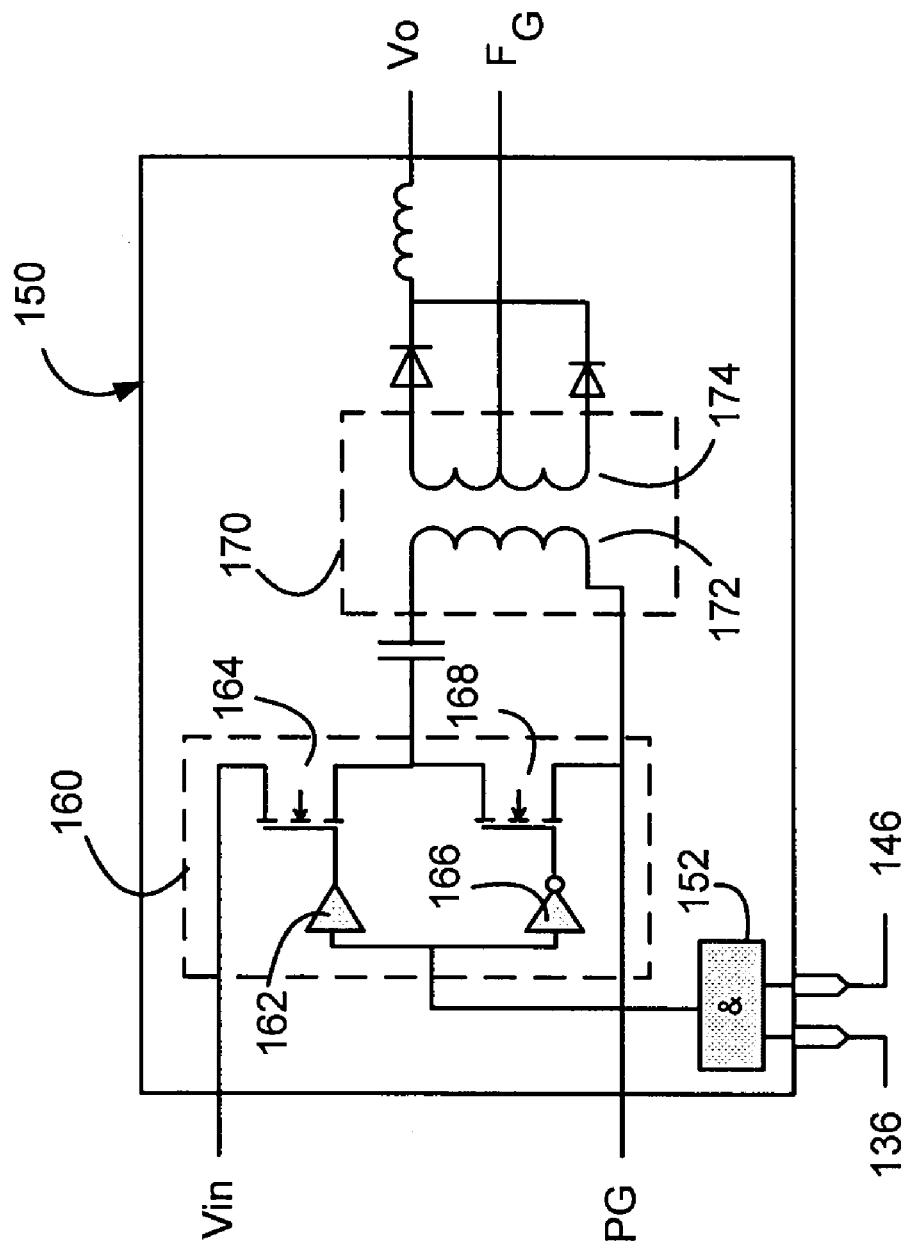
FIG. 2 is a schematic diagram of an embodiment of a unit that may be comprised in the system of FIG. 1.

Referring to FIG. 2, an embodiment of a power unit 150 is illustrated. In one embodiment, a power unit 150 may be configured to convert the input voltage Vin into the output voltage Vo. As shown in FIG. 2, a power unit 150 may comprise a switching circuit 160 that may comprise a first MOSFET 164 and a second MOSFET 166. In one embodiment, the switching circuit 160 may comprise an AND gate 162 coupled to the first MOSFET 164 and an inverter 166 coupled to a second MOSFET 168 to alternately turn on the first MOSFET 164 and the second MOSFET 166 to provide an AC input from a DC input (e.g. Vin) to the power unit 150; however, any other structure may be utilized to provide the AC input.

In another embodiment, a power unit 150 may further comprise a converter 170 that may convert the input voltage Vin transmitted via the first MOSFET 164 and the second MOSFET 166 into the output voltage Vo. In one embodiment, the converter 170 may comprise a primary winding 172 and a second winding 174; however, some embodiment may utilize any other structure to provide the conversion. In another embodiment, the power unit 150 may comprise a circuit (e.g., diode) to convert an AC output from the converter 170 into a DC output. Some embodiments may comprise one or more rectifying components. A power unit 150 may be configured to be controlled by a first control signal 136. In one embodiment, the first control signal 136 may be coupled to each power unit 150. In another embodiment, a power unit 150 may be switched on/off by a second control signal 146. With reference to FIG. 2, a power unit 150 may further comprise an AND gate 152 that may receive the first control signal 136 and the second control signal 146.

Referring again to FIG. 1, in one embodiment, the system 100 may comprise a control logic 120 to provide the first control signal 136 to control a power unit 150 and the second control signal 146 to switch on/off the power unit 150. The control logic 120 may comprise a line regulator 130 that may provide line voltage feed-forward control. For example, the control logic 120 may modulate a duty cycle of a power unit 150 (e.g., a switching circuit 160) to compensate a variation in the input to the power circuit 150, e.g., via a first control signal 136. In another embodiment, the line regulator 130 may comprise a voltage divider 138 that may divide the input voltage Vin to provide a first voltage $V_1$ to an operational amplifier 132. In one embodiment, the first voltage $V_1$ may reflect a variation in the input voltage Vin. The operational amplifier 132 may amplify a difference between the first voltage $V_1$ and a reference voltage Vref. In another embodiment, the line regulator 130 may be realized by hardware, software, or firmware or any combination thereof.

In one embodiment, the amplified difference may be used by a pulse width modulating (PWM) circuit 134 to provide the first control signal 136 to compensate variation in the input voltage Vin. In one embodiment, the first control signal 136 may comprise a pulse width modulated signal that may adjust a duty cycle of a power unit 150. In one embodiment, the PWM circuit 134 may provide a first control signal 136 with a reduced duty cycle to compensate for a higher input voltage Vin. In another embodiment, the PWM circuit 134 may provide a first control signal 136 to increase the duty cycle to compensate for a lower input voltage Vin.

With reference to FIG. 1, the control logic 120 may further comprise a load regulator 140. The load regulator 140 may enable a power unit 150 by a second control signals 146 based upon load information 148 from an electronic system that is powered by the power circuit 110. In one embodiment, the load information 148 may comprise information indicating an operating state of the electronic system, including, e.g., operating states S0-S5. In another embodiment, the load information 148 may comprise information indicating load status of the electronic system.

In one embodiment, the load regulator 140 may provide each power unit 150 with a second control signal 146 based upon the load information 148 to enable/disable the power units 150, e.g., via an address line. For example, the load regulator 140 may provide a load feed-back control. For example, the load regulator 140 may comprise a power unit on/off control circuit 142 that may be coupled to a power unit 150 and may assert the second control signal 146 to a first logic level to turn on the power unit 150 and assert the second control signal 146 to the second logic level to turn off the power unit 150. In another embodiment, a power unit 150 may be disabled, in response to an absence of a second control signal 146 or the second control signal 146 not being asserted. Some embodiments may assert a second control signal 146 to a first logic level indicating that a power unit 150 is to be enabled and to a second logic level indicating that a power unit is to be disabled. In one embodiment, the first logic level may be higher than the second logic level; however, in some embodiments, a different logic level may be used.

In another embodiment, the load regulator 140 may comprise the power unit on/off control circuit 142 configured to assert the second control signal 146 to a logic level that may turn on a power circuit. The load regulator 140 may further comprise one or more switches that may be selectively turned on based on the load information to transmit the second control signal 146 to a power unit 150 that couples to the switch that has turned on.

In one embodiment, the load regulator 140 may provide a power unit on/off control via a second control signal 146. For example, the load regulator 140 may comprise a decoder, AND gate, OR gate, switches, gate circuit or any other logic circuit. In another embodiment, the load regulator 140 may be realized by hardware, software, or firmware or any combination thereof. In another embodiment, the functions of load regulator 140 may be realized in the electronic system powered by the power circuit 110. In one embodiment, a number of the second control signals 146 may correspond to a number of the power units 150. The load regulator 140 may selectively switch on/off a power unit 150 further based on thermal distribution information in the power circuit 110 and/or time information, e.g, how long a power unit 150 has been on. The control logic 120 may further comprise an optocoupler 144 to isolate the control logic 120 (or system 100) from the electronic system. While FIG. 1 illustrates the line regulator 130 and the load regulator 140 are configured to locate in the control logic 120, in some embodiments, the line regulator 130 and the load regulator 140 may not be in the same block.

Figure 3:
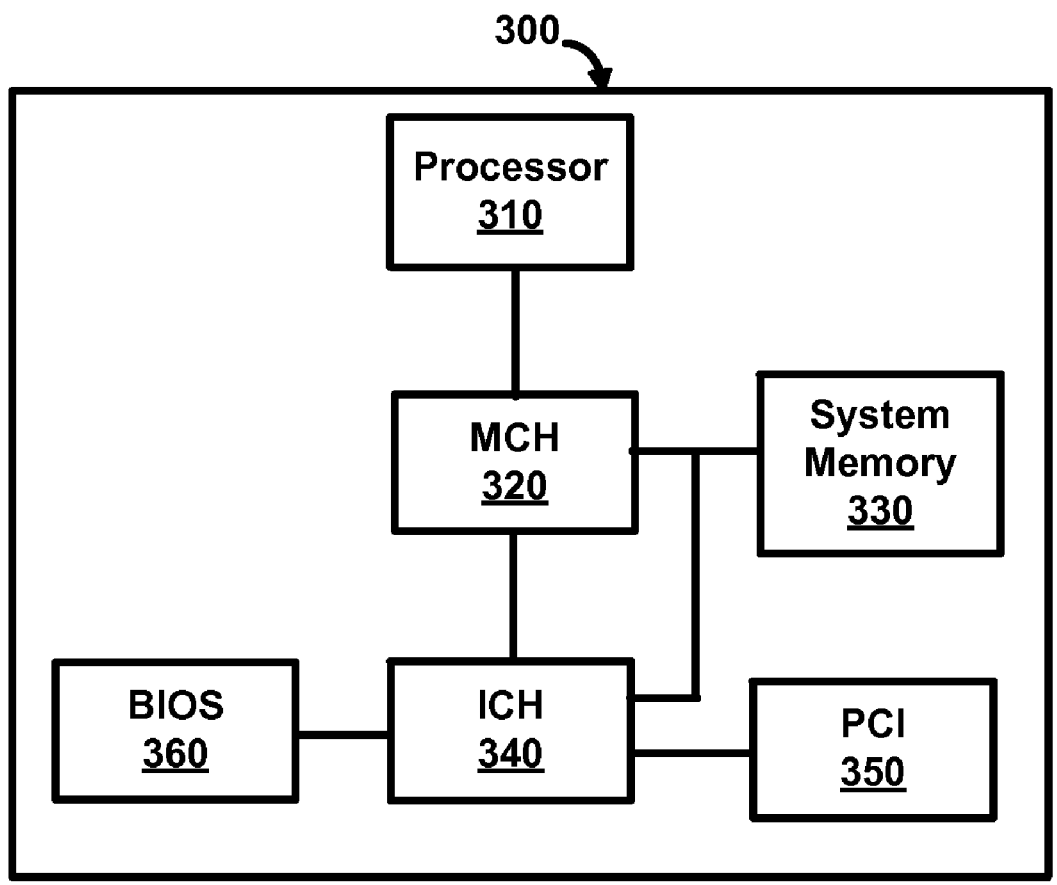
FIG. 3 is a block diagram according to some embodiments of the invention.

FIG. 3 illustrates a block diagram of an exemplary embodiment of an electronic system that may comprise a processor based system that may correspond to an example of a desktop board 300, also referred to as a motherboard. The desktop board 300 may comprise a processor 310 that may be coupled to a memory controlled hub (MCH) 320. MCH 320 may be coupled to an I/O controller hub (ICH) 340. The MCH 320 may support access to a system memory 330. For example, the system memory 330 may comprise DDR and/or dual in line memory (DIMM), or any other memory. The ICH 340 may couple to basic I/O system (BIOS) 360 that may be stored in non-volatile memory (e.g., a flash memory, a firmware hub, etc.). The ICH 34 may support e.g., a system memory bus (SM Bus), a low pin count (LPC) or serial peripheral interface (SPI) coupled to the BIOS 360, a PCI bus (coupled to one or more PCI slots). In one embodiment, the BIOS 360 may provide instructions and operations to initialize the desktop board 300.

Figure 4:
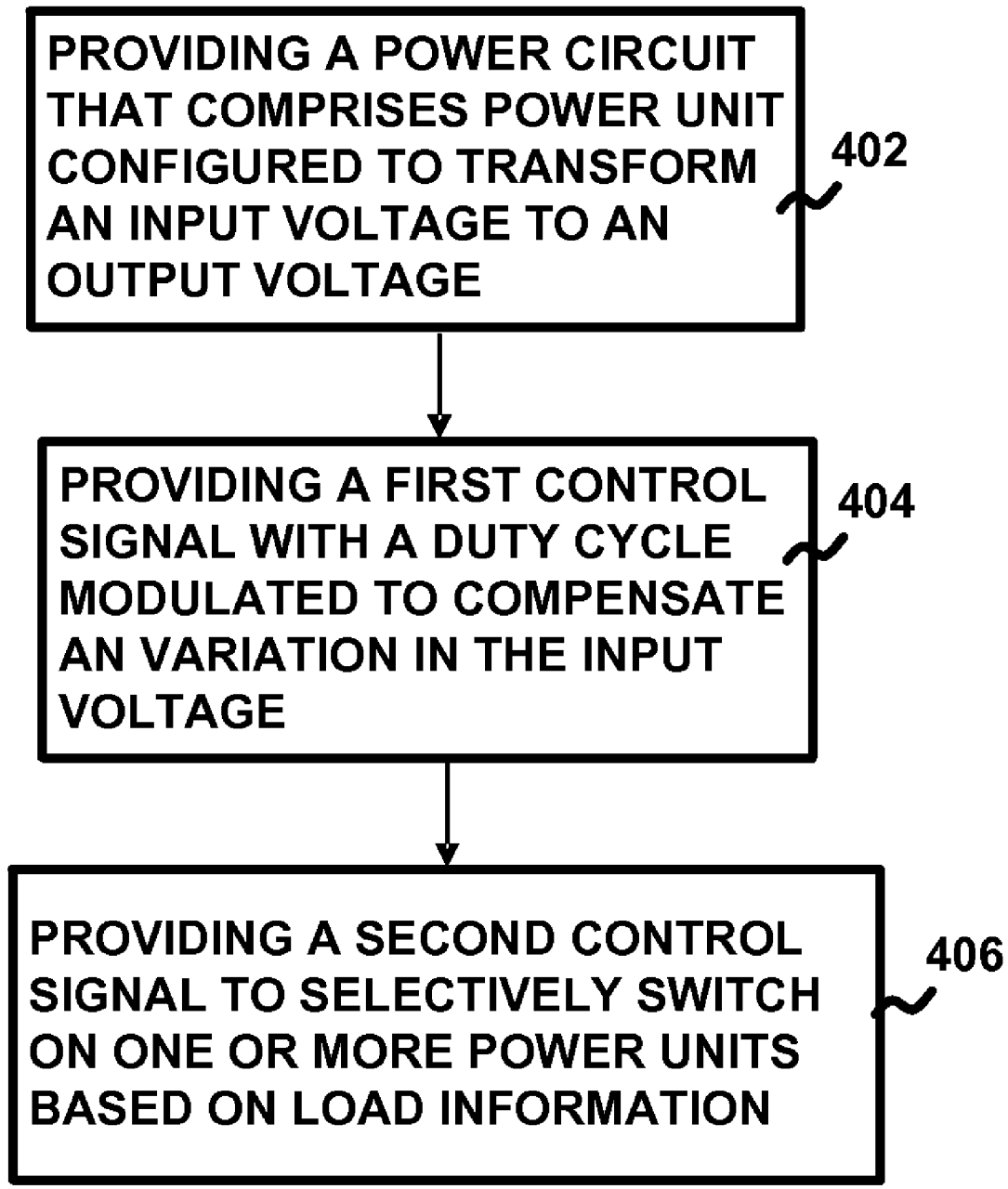
FIG. 4 is a flow chat according to some embodiments of the invention.

With reference to FIG. 4, some embodiments of the invention may involve a method that may separate line regulation and load regulation control. Some embodiments involve providing a power circuit that may comprise a set of one or more power units (e.g., at block 402). A power unit may have a power rating. In another embodiment, the power units may have the same power rating; however, in some embodiment, this may not be required. A number of the power units may be determined based on a power rating of the power circuit. The power circuit may transform an input voltage into an output voltage. An input of a power unit may couple to an input of the power circuit. An output of the power unit may couple to an output of the power circuit. In another embodiment, the set of power units may be connected in parallel. A power unit may comprise a voltage transforming circuit to transform the input voltage to the output voltage.

Some embodiments may further involve providing a first control signal to compensate a variation in the input voltage (e.g., at block 404). In one embodiment, a power unit may be configured to receive the first control signal. The first control signal may comprise a pulse signal with a duty cycle modulated to compensate the variation of the input voltage. In one embodiment, providing the first control signal to compensate a variation may comprise comparing a portion of the input voltage with a reference voltage to provide a difference signal. In some embodiments, providing the first control signal further comprising conducting pulse width modulation on the difference signal to provide a pulse width modulated signal to compensate a variation in the input voltage. In some embodiments, the pulse width modulation may reduce a duty cycle of a power unit in response to an increased difference or increased input voltage and may increase the duty cycle in response to a reduced difference or reduced input voltage. In some embodiments, providing the first control signal may further comprise amplifying the difference signal. For example, the pulse width modulation may be conducted on the amplified difference signal.

Some embodiments may further involve providing a second control signal to selectively switch on one or more power units based on load information (e.g., at block 406). For example, the load information may be provided by an electronic system that is powered by the power circuit. For example, providing a second control signal may comprise providing an ON signal to switch on or enable a power unit and an OFF signal to switch off or disable a power unit based on the load information. Some embodiments may involve turning on an increased number of power units in response to an increased or higher load of the electronic system. Some embodiments may involve turning off a number of power units based on a lower load of the electronic system or turning on a reduced number of power units in response to a reduced or lower load of the electronic system. In another embodiment, providing the second control signal may comprise decoding the load information to provide the second control signal. In another embodiment, the providing the second control signal may be further based on thermal distribution information of the power circuit and/or time information, e.g., how long a power unit has been on. While the method of FIG. 4 is illustrated to comprise a sequence of processes, the method in some embodiments may perform illustrated processes in a different order.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system to supply power to an electronic system, comprising:
    a set of a plurality of power units each configured to transform an input voltage into an output voltage, the plurality of power units being connected in parallel;
    a load regulator configured to control each power unit to turn on an increased number of the power units in response to an increased load of the electronic system and turn on a reduced number of the power units in response to a reduced load of the electronic system; and
    a line regulator coupled to at least one power unit and configured to modulate a duty cycle of the power unit.

2. The system of claim 1, wherein:
    the load regulator further configured to selectively enable a number of the power units based on thermal distribution information in the system.

3. The system of claim 1, wherein a power unit comprises:
    a switching circuit to transform the input voltage into an alternating current input; and
    a converter to convert the alternating current input into the output voltage.

4. The system of claim 1, wherein the line regulator comprises:
    a pulse width modulator configured to provide a first control signal with a modulated duty cycle to the power unit to compensate a variation in the input voltage.

5. The system of claim 4, wherein the line regulator comprises:
    an operational amplifier configured to provide an amplified difference signal based on the input voltage and a reference voltage to the pulse width modulator.

6. The system of claim 1, wherein the load regulator comprises:
    a decoder coupled to a power unit and configured to selectively turn on the power unit based on load information from the electronic system.

7. A method to supply power to an electronic system, comprising:
    providing a plurality of power units each configured to transform an input voltage to an output voltage to be provided to the electronic system, the plurality of power units being connected in parallel; and
    selectively switching on an increased number of the power units in response to an increased load of the electronic system and switching on a reduced number of the power units in response to a reduced load of the electronic system.

8. The method of claim 7, each power unit comprising:
    a switching circuit configured to provide an AC input from the input voltage;
    a converter configured to convert the AC input to an AC output; and
    a circuit configure to convert the AC output to the output voltage.

9. The method of claim 7, comprising:
    selectively turning off a number of power units based on thermal distribution information in the plurality of power units.

10. The method of claim 7, comprising:
    providing a control signal with a duty cycle modulated to compensate a variation in the input voltage.

11. The method of claim 7, comprising:
    providing a pulse width modulated signal based on a difference between the input voltage and a reference voltage to compensate a variation in the input voltage.

12. The method of claim 7, comprising:
    reducing a duty cycle of a power unit in response to an increased input voltage.

* * * * *